Figure 1:
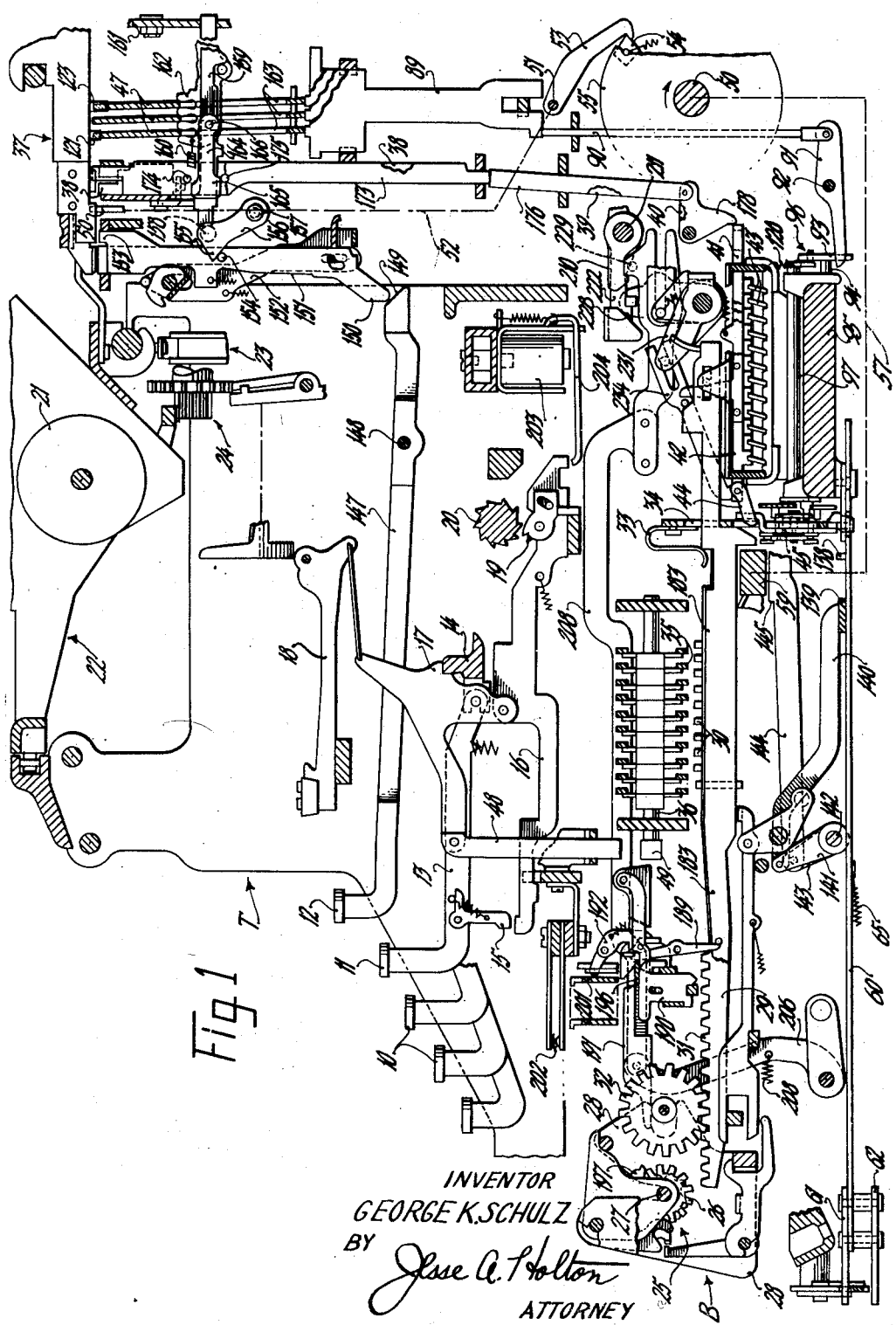

Nov. 24, 1953  G. K. SCHULZ  2,660,369
CARRIAGE CONTROLLED TOTALIZER CONTROL MECHANISM
Filed Aug. 30, 1950  6 Sheets-Sheet 1

INVENTOR
GEORGE K. SCHULZ
BY
Jesse A. Holton
ATTORNEY

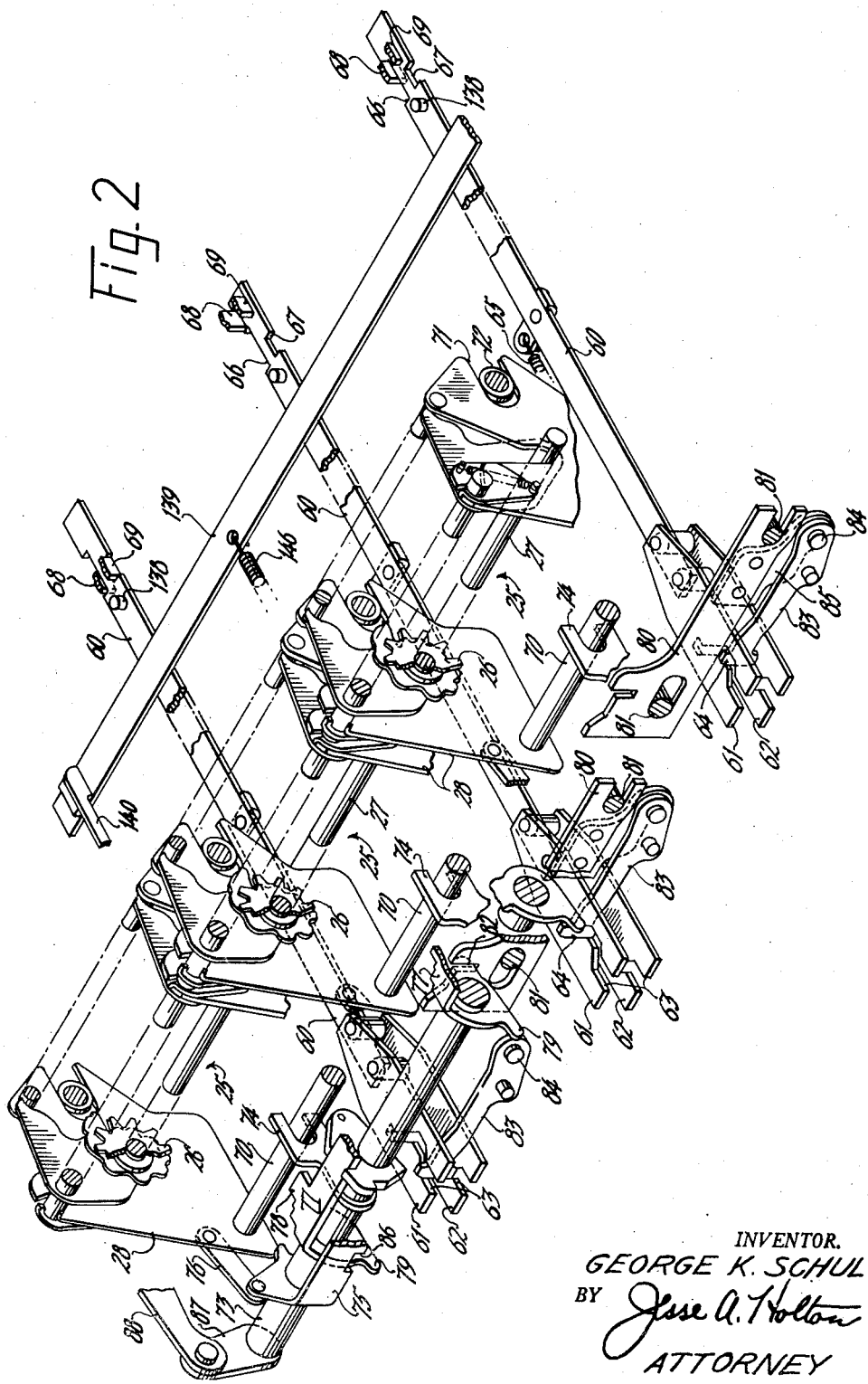

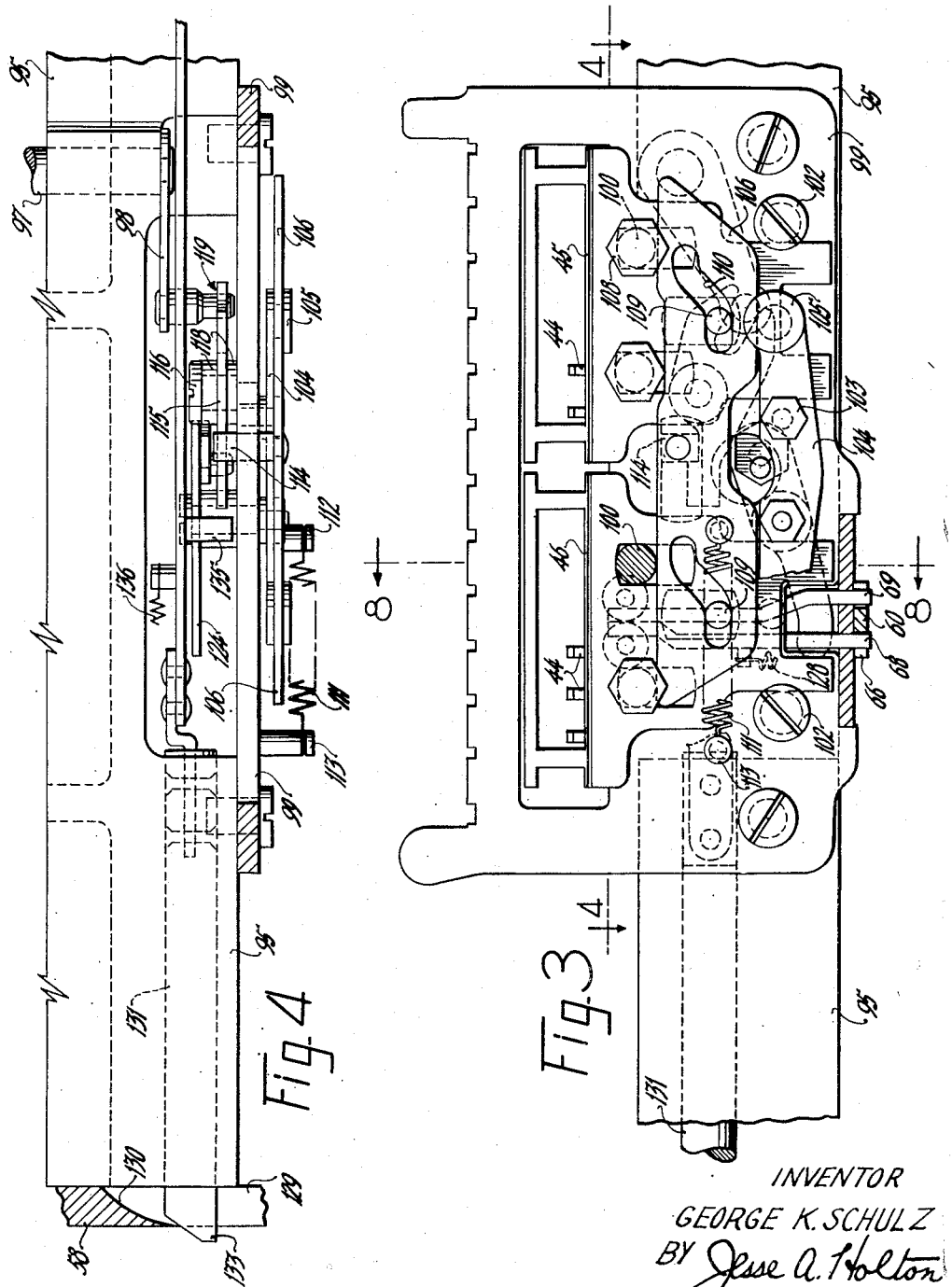

Nov. 24, 1953 G. K. SCHULZ 2,660,369
CARRIAGE CONTROLLED TOTALIZER CONTROL MECHANISM
Filed Aug. 30, 1950 6 Sheets-Sheet 4

INVENTOR.
GEORGE K. SCHULZ
BY Jesse A. Holton
ATTORNEY

Nov. 24, 1953  G. K. SCHULZ  2,660,369
CARRIAGE CONTROLLED TOTALIZER CONTROL MECHANISM
Filed Aug. 30, 1950  6 Sheets-Sheet 5
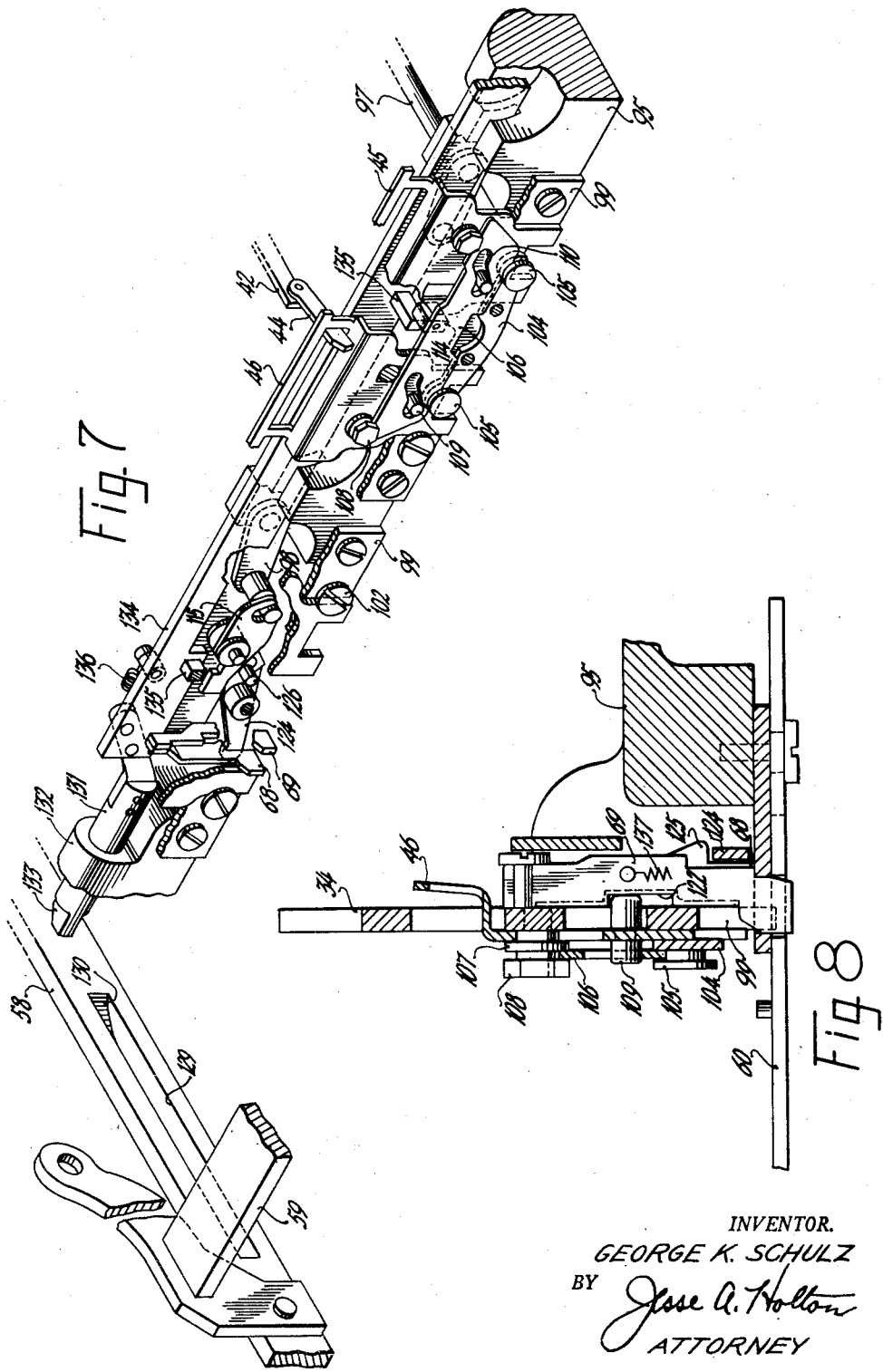
INVENTOR.
GEORGE K. SCHULZ
BY Jesse A. Holton
ATTORNEY

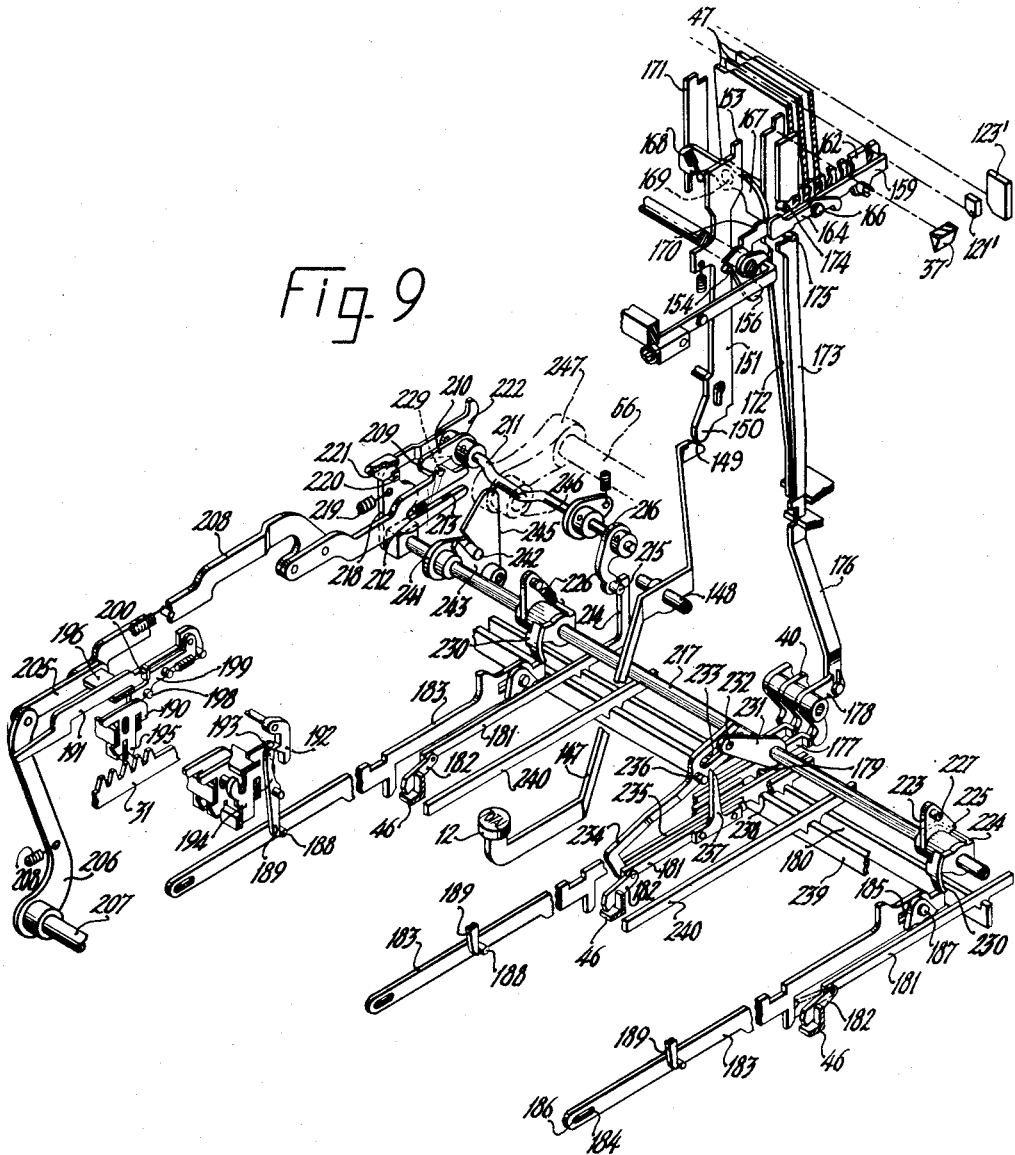

Patented Nov. 24, 1953

2,660,369

UNITED STATES PATENT OFFICE 2,660,369

CARRIAGE CONTROLLED TOTALIZER CONTROL MECHANISM

George K. Schulz, Rockville, Conn., assignor to Underwood Corporation, New York, N. Y., a corporation of Delaware Application August 30, 1950, Serial No. 182,195

5 Claims. (Cl. 235—60.39)

1

The present invention relates in general to accounting or bookkeeping machines and more specifically to a combined typewriting and computing machine. The particular machine over which the present invention constitutes an improvement is shown and described in the H. L. Pitman Patent 2,372,681, issued April 3, 1945.

The particular machine illustrated has three add-subtract totalizers or registers, from each of which a total may be automatically read out and printed, but it will be understood that the present invention is equally applicable to machines having a greater or lesser number of totalizers.

It is an object of the present invention to provide an accounting machine having a movable carriage and capable of printing and recording in a number of different columnar positions with an improved means for automatically selecting different registers for different columnar positions.

It is another object of the invention to provide an accounting machine having a plurality of add-subtract totalizers with an improved means whereby any number of the totalizers may be automatically selected for performing additive operations while any of the other totalizers are simultaneously selected for performing subtractive operations.

It is a further object of this invention to provide a combined typewriting and accounting machine having an improved means for automatically selecting the various functions to be performed by the totalizers thereof.

It is a still further object of this invention to provide a combined typewriting and accounting machine having a plurality of add-subtract totalizers with means for automatically printing the amount standing in any of the totalizers and simultaneously with the clearing of said totalizer to enter said amount into any other desired totalizer either additively or subtractively.

These and further objects, features and advantages of the present invention will be more particularly described as the description of a preferred embodiment thereof proceeds.

Referring now to the drawings:

Fig. 1 is a side elevation, partly in section, of a machine embodying the present invention, with many of the parts not necessary for an understanding of the invention being omitted, Fig. 2 is a perspective view of a portion of the register selecting mechanism, Fig. 3 is an elevational view of a portion of the register selecting mechanism, the same being shown in an unactuated or neutral condition,

2

Figure 5:
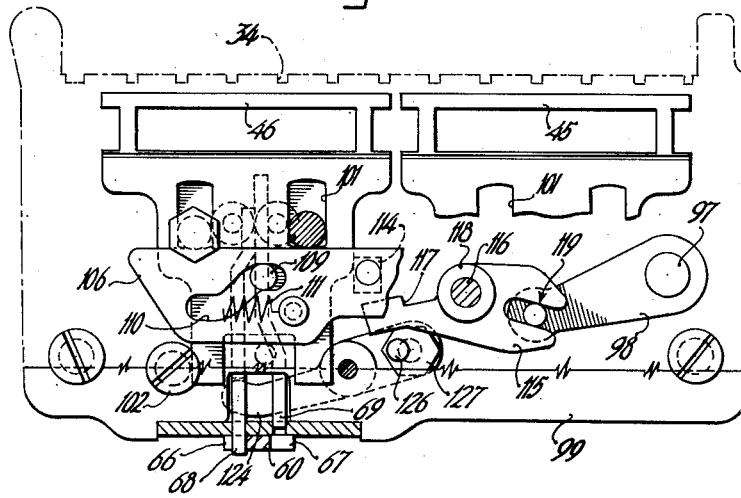
Figure 6:
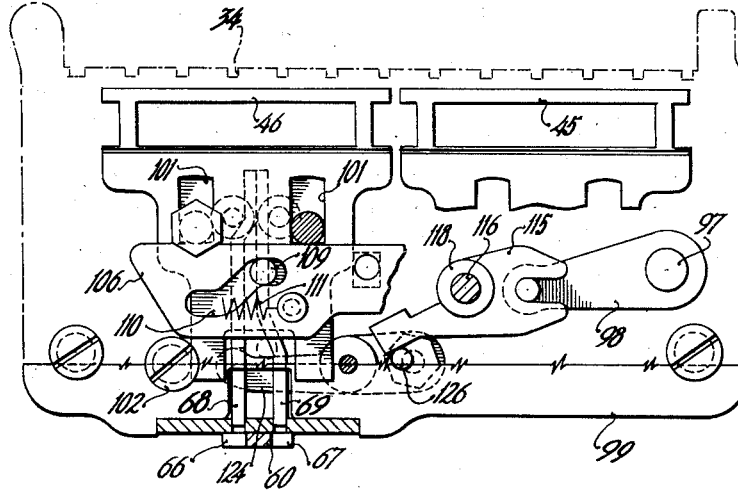

Fig. 4 is a plan view of a portion of the mechanism shown in Fig. 3, taken along line 4—4 of Fig. 3, Fig. 5 is a view similar to Fig. 3 but showing the mechanism conditioned for determining an adding operation of the totalizer, Fig. 6 is a view similar to Fig. 3 but showing the mechanism conditioned for determining a subtracting operation of the totalizer, Fig. 7 is a perspective view showing a portion of the register selecting mechanism and also showing the means for restoring the mechanism to a neutral condition after an operation has been performed, Fig. 8 is a section taken along the line 8—8 of Fig. 3, and, Fig. 9 is a perspective view showing the means for selecting a totalizer for automatic total printing operations and for selecting a second totalizer for receiving by transfer the total standing in the first totalizer.

As a study of the above referred to patent, No. 2,372,681, over which the present invention constitutes an improvement, will indicate, the herein described machine is comprised of a typewriting unit T surmounting a computing base B, as generally shown in Fig. 1.

The typewriter unit is herein shown stripped of all but its bare essentials, since the details thereof have no bearing upon the present invention. The unit T may conveniently be constructed as shown in the patent to H. L. Pitman, No. 2,398,395, issued April 16, 1946, but it will, of course, be understood that numerous changes as to details may be made without departing from the spirit of the present invention.

Briefly described, the typewriting unit comprises the usual alphabet keys 10, a row of numeral keys 11 and a row of decimal tabulator keys 12, the tabulator key 12 shown in Fig. 1 being the one which institutes an automatic total printing operation, as will be more fully referred to later. The numeral keys 11 are carried by key stems 13 pivotally mounted upon a stationary cross member 14 and each key stem 13 is provided with a pendant 15 for cooperative engagement with a draw link 16. The draw links 16 are pivotally connected intermediate their ends to levers 17 which levers are in turn connected by links to the type bars 18, only one of which is shown. Depression of any one of the numeral keys 11 causes the corresponding pendant 15 to rock the corresponding draw link 16 about its pivotal connection with the lever 17 and thereby move a pawl 19 carried by the draw link into engagement with a constantly rotating fluted shaft 20. The enagement of the pawl 19 with the fluted shaft will cause the type bar 18 to move in a clockwise direction and thereby cause the type to strike against a record sheet carried by the platen 21 mounted on a carriage 22, as will readily be understood. The carriage 22 is continuously urged toward the left side of the machine by the usual spring motor generally indicated in Fig. 1 at 23 and, upon actuation of a type bar, an escapement mechanism generally indicated at 24, which may be of any desired construction, is operated to permit the carriage to move one letter space to the left.

In the computing base B are mounted a plurality of totalizers, three in the present instance, generally designated by reference numeral 25, see Figs. 1 and 2. Each totalizer comprises a set of accumulating wheels or order units 26 rotatably mounted upon a shaft 27 carried by rockable frame plates 28. For each totalizer there is a set of pin bars 29 each having a row of depressible digit pins 30 and a drive rack 31 meshing with a companion idler 32. The pin bars are normally positioned by spring devices 33 against a comb guide 34 so that their pins 30 are out of line with corresponding pin setting bars 35, each of which is operatively connected to a rock shaft 36.

For each computing zone, the typewriter carriage 22 is provided with a column unit 37 adapted to depress seriatim a series of denominational jacks 38. Each jack 38, when depressed, operates through a push link 39 and bell crank 40 to move endwise a corresponding master rack 41 in the base section B. Associated with each set of pin bars 29 is a set of distributive racks 42, each connected to a corresponding master rack 41 by a rockable cross blade 43. Each set of distributive racks has a set of couplers 44 liftable by a pair of plates 45 and 46, see Figs. 1 and 3, into operative alignment with the pin bars 29.

Upon entry of the carriage into a computing zone, the column unit 37 selects and depresses one or more of a series of operation controlling cam plates 47 to thereby raise the corresponding plates 45 and 46 and raise the couplers 44 into operative alignment with the pin bars 29. The operative connection between the cam plates 47 and the coupler lifting plates 45 and 46, in accordance with the present invention, will be described later in this specification. As the carriage advances through the computing zone, the denominational jacks 38 are traversed by the column unit 37 to thereby advance seriatim the pin bars 29 to pin setting positions under the bars 35. The seriatim advance of the pin bars is effected concomitantly with the letter feeding movements of the carriage as the numeral type actions are actuated to type the amount to be indexed.

The levers 17 of the various type actions are each provided with a pendant so that when said type action is operated to print its digit, the pendant engages a crank 49 on the corresponding shaft 36 to rock the latter to depress the corresponding pin setting bar 35 and set the corresponding digit pin 30 in the pin bar 29 that stands advances to pin setting position. The pin setting bars 35, rock shaft 36 and cranks 49 constitute an indexing mechanism by which the amount represented by the digits being typed is set up or indexed in one or more sets of pin bars 29.

In the letter-feed step of the carriage which attends the typing of the last digit of an amount, the column unit 37 overrides and rocks a cycle trip lever 50, partially shown in Fig. 1. Said lever 50 in turn rocks a shaft 51, in the computing base, counterclockwise through a connection diagrammatically represented by the chain-dotted line 52, Fig. 1. This retracts a latch arm 53 from a stud 54 fixed to a disk 55, and it results that the disk, spring urged, rotates slightly clockwise about a cycling shaft 56 journalled in the base section. This slight rotation of disk 55 closes a clutch, not shown, for a resulting revolution of said shaft. Just before the end of this revolution, which also turns the disk 55, the stud 54 again encounters the then restored latch arm 53 so that the disk is arrested while the shaft 56 rotates slightly further relative to the disk to cause the clutch to reopen to limit the rotation of shaft 56 to one revolution or cycle.

The above described power drive and control features may be substantially as described in Patent No. 2,160,487, issued May 30, 1939, to H. L. Pitman.

By means of an operative connection similar to that described in the H. L. Pitman Patent No. 2,178,702, and diagrammatically represented by chain-dotted line 57 in Fig. 1, one element of which is indicated as 58 in Figs. 4 and 7, the cycle of revolution of shaft 56 reciprocates a general operator bar 59, Figs. 1 and 7. In its advance stroke, the general operator bar 59 cooperates with the set digit pins 30 to advance the pin bars 29 to extents corresponding to the pins which are set. Means presently to be described, the operation of which is controlled by the cam plates 47, causes the selected totalizers to be rocked during the very first part of the cycle to mesh their order wheels 26 directly with the racks 31 for additive operation or with the idlers 32 for substractive operation and during the first half cycle, while the general operator bar 59 is moving toward the front of the machine, the order wheels of the selected totalizers are rotated extents corresponding to the indexed digit pins. The machine is equipped with carry-over and "fugitive one" mechanism shown in Fig. 1, but same is not herein described because it is the same mechanism fully described in the copending application of H. L. Pitman, No. 2,654, filed January 16, 1948.

To cause the various totalizers to perform the desired function, a state-control slide 60 is provided for each totalizer. Each state-control slide 60 is provided upon its forward end with a pair of plates 61 and 62 and each plate is provided with a cam slot 63, see Fig. 2. A follower 64 is positionable in either of the slots 63, which slots are provided with stepped lands so that at different forward positions of the state-control slides the follower 64 will be moved to the right or to the left of the machine to cause the associated totalizer to perform different functions. The two plates 61 and 62 are provided to adapt the machine to accommodate a reversing mechanism as fully explained in the copending application, Serial No. 49,345, filed September 15, 1948, by A. H. Sharpe, but since said reversing mechanism per se forms no part of the present invention it need not be further referred to and in this specification, it will be considered that the followers 64 are always positioned within the cam slots 63 of the upper plates 61.

Each state-control slide 60 is urged toward the front of the machine by a spring 65, and is provided, adjacent its rear end, with a pair of notches 66 and 67 which normally accommodate a pair of latch members 68 and 69 respectively, see particularly Fig. 2. The latch members 69 extending into the notches 67 normally hold the state-control slides in their rearmost or non-computing positions.

The state-control slides are shown in Fig. 2 in three different positions. The left hand slide is shown in its normal position, with the latch members 68 and 69 seated within their respective notches, and when the state-control slide is so positioned the associated totalizer performs no function during a cycle of machine operation. The right hand state-control slide 60 is shown as having moved forward under the action of its spring 65 to an addition determining position, the latch member 69 having been withdrawn and the latch member 68 being positioned within notch 66, which it will be noted is longer than the notch 67. For the middle state-control slide, both latches 68 and 69 are shown as withdrawn from their respective notches and the slide is shown in its extreme forward position for determining a subtractive operation of its associated totalizer.

As explained in the above referred to application, No. 49,345, each pair of totalizer supporting plates 28 are tied together by a rod 70 and each plate is provided with a slot 71 riding on roller 72, see Fig. 2. A rock shaft 73 extending across the front of the machine has loosely mounted thereupon a bifurcated member 74 for each totalizer, said members straddling the tie rods 70. There are three bail members 75, only one of which is shown in Fig. 2, loosely mounted upon the rock shaft 73 and these bail members are connected to the register supporting plates 28 by links 76, only one of which is shown. A slide 77 for each totalizer is keyed to the rock shaft 73 for rocking movement therewith and for sliding movement therealong, said slides each having a tab 78 for sometime cooperation with the associated bifurcated member 74 and a tail 79 for sometime cooperation with the associated bail member 75. There is a second slide member 80 associated with each of the slides 77, said members 80 being mounted upon a pair of stationary pins 81 fixed to a frame member and being keyed to the slides 77 at 82, see Fig. 2. The followers 64 are each carried by an arm 83 pivotally connected at 84 to an element 85 riveted or otherwise secured to each of the members 80.

Thus, as may be seen in Fig. 2, when a state-control slide 60 moves half way forward due to the withdrawal of the latch member 69, the follower 64 is moved to the right due to the shape of the cam slot 63. Since the follower 64 is operatively connected, as above described, to the slide 77, this half way forward movement of the state-control slide will move the slide 77 to the right to position the tab 78 thereof directly above the bifurcated member 74. When both the latch members 68 and 69 are withdrawn, the state-control slide moves to its full forward position, and as will readily be observed in Fig. 2, such movement of the state-control slide results in a movement of the follower 64 to the left which will in turn cause the slide 77 to move to the left and thereby position its tab 78 out of vertical alignment with the bifurcated member 74 and position its tail 79 beneath the lower edge of the bail member 75, it being here pointed out that the tail 79 is normally aligned with a notch 86 of the bail member.

The rock shaft 73 is provided with a crank arm 87 which is operatively connected by a link, partially shown at 88, to the mechanism diagrammatically indicated in Fig. 1 at 57 for moving the general operator bar 59. Since the details of construction of the means for rocking the rock shaft 73 are not important to the present invention it is believed to be sufficient to state that the arrangement is such that during the initial part of a cycle, before the general operator bar 59 has engaged any of the set index pins 30, the rock shaft 73 is rocked in a clockwise direction as viewed in Fig. 2. At the beginning of the second half of the cycle, and before the pin bars 29 begin their return movement, the rock shaft 73 is rocked in a counter-clockwise direction to return it to its home position shown in Fig. 2. For a disclosure of the details of the mechanism for rocking the rock shaft 73, reference may be had to the copending application of H. L. Pitman, No. 45,372, filed August 20, 1948.

With a state-control slide 60 in its halfway forward position and the tab 78 of slide 77 thereby positioned above the bifurcated member 74, rocking of the rock shaft 73 in a clockwise direction causes the tab 78 to depress the bifurcated member and thereby rock the frame plates 28 of the associated register downward about the rollers 72 to thereby engage the wheels 26 directly with the drive racks 31 so that any forward movement of the drive racks will be imparted to the totalizer wheels to rotate said wheels in an adding direction, as aforesaid. With a state-control slide in its full forward position and the tail 79 of the slide 77 thereby positioned beneath the lower edge of the bail member 75, rocking of the rock shaft 73 in a clockwise direction causes the links 76 to push the frame plates 28 of the associated register rearwardly along the rollers 72 to thereby mesh the wheels 26 with the idlers 32 so that forward movement of the drive racks 31 will rotate said wheels in a subtractive direction through said idlers, as above noted.

The present invention provides novel means for operating the latches 68 and 69 so that any of the totalizers may be caused to perform additions while any others are simultaneously performing subtraction or are idle or non-computing. The selection of the condition or state of the totalizers is entirely under the control of the paper carriage, or more specifically of the column units 37 carried thereby.

As seen in Fig. 1, each of the condition controlling cam plates 47 rests upon a plate 89 extending transversely thereof and each plate 89 rests in turn upon a push rod 90, only one of which is shown. Each rod 90 is pivotally connected to one end of a lever 91. The lever 91, shown in Fig. 1, is pivotally mounted at 92 and the end opposite the rod 90 underlies one arm of a bell crank 93 which is pivotally mounted upon a stub shaft 94 carried by a frame member 95. As explained in the above referred to application, No. 49,345, the other arm of the bell crank 93 is connected by a pin-and-slot connection, indicated in Fig. 1 at 96, to a crank arm carried by one end of a rock shaft 97. As will readily be understood, there are three of the rock shafts 97 in the present machine, one for each totalizer, but since they are all operated in substantially the same manner only one has been shown, and the description will refer only to one of them. The rock shaft 97 is provided with a crank arm 98, as seen in Figs. 4 through 7, at the end opposite the above referred to crank arm.

Secured to the front edge of the frame member 95 and extending vertically are three guide plates 99, two of which are shown in Fig. 7. The upper portions of the plates 99 are notched, as shown in chain-dotted lines in Figs. 3, 5 and 6, to form the hereinbefore referred to comb guides 34. The mechanism supported and guided by each of the guide plates is the same, and it is therefore necessary to describe only one of the sets of mechanisms. Each guide plate 99 is provided with four guide pins 100 extending through elongated slots 101 in the coupler lifting plates 45 and 46, and with four more guide pins 102 bearing against the lower vertical edges of said coupler lifting plates, to thereby limit the movement of said plates to a vertical plane. The two innermost guide pins 102 extend beyond the outer face of the coupler lifters 45 and 46 and are provided with nuts 103 which secure a member 104 to said pins. The member 104 is provided, upon its extremities, with a pair of headed guide pins 105 upon which pins the lower edge of a slide 106 is confined by the headed portions thereof. The upper edge of the slide 106 is guided by the two outermost guide pins 100 and is confined between a shoulder 107 of said guide pins and an enlarged head 108 thereof, see particularly Fig. 8.

The coupler lifting members 45 and 46 are each provided with a pin 109, each pin extending into an S-shaped slot 110 in the slide 106. The slide 106 is urged toward the left as viewed in the drawings by a spring 111 extending between a pin 112 on said slide and a pin 113 on the guide plate 99. A square stud 114 is rivetted or otherwise secured to the slide 106, and a latch member 115 pivotally mounted upon a headed screw 116 carried by the guide plate 99 is provided with a shouldered portion 117 for normally cooperating with said square stud, as shown in Figs. 3 and 4, to hold the slide 106 in its right hand position against the action of the spring 111. As best seen in Fig. 4, a pair of washers 118 on the screw 116 hold the latch member 115 in proper spaced relation to the guide plate 99. The latch member 115 is connected to the crank arm 98 by a pin-and-slot connection 119, and a spring 120, Fig. 1, hooked to the crank arm on the shaft 97 at the opposite end from the crank arm 98 serves to yieldably hold the shouldered portion 117 of the latch member in cooperative relation with the square stud 114.

When a dog 121, Fig. 1, depresses one of the cam plates 47, the depressed plate operates through its associated plate 89, push rod 90, lever 91 and bell crank 93 to rock the shaft 97 and its crank arm 98 to thereby move the shouldered portion 117 from engagement with the square stud 114 and thereby allow the spring 111 to move the slide 106 from the position shown in Figs. 3 and 4 to the position shown in Figs. 5 and 6. The pins 109 of the coupler lifter plates 45 and 46, of course, follow the path of the S-shaped slots 110 of the slide and said plates are thereby raised, as will readily be understood, to position the couplers 44 for operatively connecting the distributive racks 42 to the set of pin bars 29. As best seen in Fig. 8, the pin 109 of the coupler lifter plate 46 extends through said plate and fits into the upper end of a slot 122 provided in the latch member 69. Thus when the coupler lifting plates are raised, the latch member 69 is simultaneously raised to allow the state-control slide 60 to move forward to an addition determining position, as hereinabove explained. The parts carried by the guide plate 99 are at this time in the positions shown in Fig. 5.

If instead of the short dog 121, the column unit 37 is provided with a long dog such as 123, it will be appreciated that the associated cam plate 47 will be depressed a greater distance and the latch member 115 will be rocked to a greater extent. In fact the latch member 115, under these conditions, will move from the position shown in Fig. 5 to the Fig. 6 position. Pivotally mounted upon one of the guide pins 102 is a rockable member 124 one end of which is positioned beneath a nose 125 provided upon the latch 68, as best seen in Figs. 7 and 8. The other end of the rockable member is provided with a pin 126 carried eccentrically upon bolt 127 so that by turning the bolt the position of the pin may be adjusted. As best seen in Figs. 5 and 6, the pin 126 underlies one end of the latch member 115 and the additional movement imparted to said latch member by the longer dog 123 causes said latch member to strike the pin 126 and thereby rock the rockable member 124 in a clockwise direction and cause the end thereof opposite the pin 126 to engage the nose 125 and withdraw the latch member 68 from engagement with the state-control slide. This withdrawing of the latch member 68 after the latch member 69 has been withdrawn allows the state-control slide 60 to move forward to its full extent and thereby condition the associated totalizer for performing a subtractive operation.

Since, as explained in the above referred to Patent No. 2,372,681, the column unit dogs engage their associated cam plates 47 during the entire traverse of the various computing columns, it will be appreciated that by a proper placement of long and short column unit dogs, it is possible to have as many of the totalizers active in each computing column as desired and the totalizers may be operated additively or subtractively in any combination desired.

As the carriage passes out of a computing column, it is desirable that the state-control slides and the above described mechanism for releasing said slides be restored to normal position so that different selections may be made in the next column and for that purpose, the following cycle operated means has been provided.

As soon as the long dog 123 moves off of its cam plate 47, the pressure of the end of latch member 115 is removed from the pin 126 of the rockable member 124 and the state-control latch 68 is then lightly pressed against the top side of the state-control slide 60 by a spring 128 shown in Fig. 3 and will be pressed by said spring into the notch 66 as soon as the state-control slide is returned to its normal position, in a manner presently to be pointed out.

The movement of the long dog 123, or of the short dog 121, off of its associated cam plate 47 also allows the hereinbefore referred to spring 120 to rock the crank arm 98 in a counterclockwise direction so that the end of the latch member 115, carrying the shoulder 117, will bear lightly against the lower edge of the square stud 114. Now as the cycle of machine operation begins, due to the column unit 37 passing over the cycle trip lever 50, as previously mentioned, the general operator bar 59 moves forward under the action of the operative connection diagrammatically indicated in Fig. 1 at 57 and the element 58, shown in Figs. 4 and 7, also moves forward, as will readily be appreciated.

The element 58 is provided with a slot 129 extending therethrough, said slot having a sloping end 130, as shown in Figs. 4 and 7. A member 131 is slidably mounted in an enlarged portion 132 of the frame member 95 and is provided with a sloping end 133 normally positioned within the slot 129 of the element 58. An elongated slide member 134, provided with three square studs 135, one for each of the square studs 114 of the slides 106, is secured by rivets or otherwise to the member 131, and a spring 136 is provided for urging said slide member toward the left to seat the end 133 of the member 131 within the slot 129 in the manner shown in Fig. 4. As the element 58 moves forward during the cycle, the slide member 134 will be moved to the right due to the camming action of the two sloping ends 130 and 133, and as best seen in Figs. 4 and 7 the square studs 135 of the slide member 134 will coact with the square studs 114 of any of the slides 106 which may have been allowed to move to the left and thereby return said slides 106 to normal position, at which time the shouldered portion 117 of the latch member 115 will snap over the square stud 114 and hold the slide 106 until such time as another dog, similar to the column unit dogs 121 or 123, depresses a cam plate 47. During the latter part of the cycle, the end 133 of the member 131 is again moved into the slot 129 by the spring 136, thus moving the square studs 135 away from the studs 114 so that the slides 106 will be free to move to the left in the next computing column. With the slide 106 in normal position a light spring 137, see Fig. 8, on the latch member 69 is free to move said latch member into engagement with the top of the state-control slide 60 in position to snap down into the slot 67 when said state-control slide is returned to normal position.

As best seen in Figs. 1 and 2, each state-control slide 60 is provided with an upright pin 138 located a short distance in advance of the notches 66 and 67. A transverse bar 139 rests lightly upon the top of the state-control slides and is normally positioned, as seen in Figs. 1 and 2, a short distance in advance of the pins 138. The bar 139 is provided with a pair of links 140 each of which is pivotally connected to an arm 141 fixed to a transverse shaft 142. Also secured to said transverse shaft is an arm 143, Fig. 1, to which is pivotally connected a link 144 having a shoulder 145. Means, not shown, which may be merely a spring or may be as described in the copending application No. 2,654 of H. L. Pitman, filed January 16, 1948, is provided for moving the link 144 upward during the first half of a cycle so that the shoulder 145 thereof is in position to be picked up by the lower rear edge of the general operator bar 59 during the latter half cycle. Thus, during the latter part of the second half of the cycle, the general operator bar 59 picks up the shoulder 145 and draws the link 144 toward the rear to thereby rock the shaft 142 and through the links 140 move the transverse bar 139 toward the rear. As the bar 139 moves rearward, it contacts the pin 138 of any of the state-control slides 60 which have previously moved forward to register selecting positions and moves said slide or slides rearwardly until the notches 66 and 67 thereof are aligned with the latch members 68 and 69. Since, as previously pointed out, the latch members 68 and 69 are at that time spring pressed against the top edge of the state-control slide, said latch members are snapped down into their respective notches and hold the state-control slide in normal position until another selection is made by the column unit 37. At the very end of the cycle, the link 144 is moved downwardly to disengage the shoulder 145 from the general operator bar 59, as explained in said application No. 2,654, and a spring 146, Fig. 2, restores the transverse bar 139 to its normal position out of contact with the pins 138.

The automatic total printing mechanism with which the present machine is equipped is similar in many respects to that shown and described in the hereinbefore referred to Patent No. 2,398,395 and reference may be had to said patent for a disclosure of certain of the details of construction not herein described.

The total key or total tabulating key 12 is carried by a key lever 147 pivotally mounted at 148 and provided with a beveled end 149, see Figs. 1 and 9. It will be understood that the machine is provided with a tabulator key for each denominational order of the totalizers but that the particular tabulator key 12 illustrated is the one used when taking automatic totals. The beveled end 149 cooperates with a nose 150 of a projectable tabulator reed 151. In the present instance, the reed 151 is projected under power by means of bail member 152 in a manner described in the copending application No. 45,373 of H. L. Pitman, filed August 20, 1948, but said reed may be raised manually if desired, or in any other convenient manner. At any rate, regardless of the manner by which the reed is raised, when it is in raised or projected position, the carriage is liberated from the domination of the escapement mechanism 24 and moves under the power of the spring drum 23 until the column unit 37 strikes the upper end 153 of said reed, at which time the carriage is returned to the control of the escapement mechanism.

The total tabulator reed 151 is provided with a pin 154 protruding from one side thereof and a nose 155 of a member 156 mounted upon a stationary pivot 157 rests lightly upon the top of said pin. The member 156 is provided with a stud 158 against which the end of a slide 159 is slightly pressed by a spring 160. One end of the slide 159 is guided by a slot provided in a stationary plate 161, see Fig. 1, and said slide carries a comb 162 engaging a portion of the cam plates 47. Both the slide 159 and the comb 162 extend through slots 163 provided in said cam plates. An interponent 164 having an enlarged head 165 is pivotally mounted upon the slide 159 at 166.

The cam plates 47 are shown in Figs. 1 and 9 in their forward tilted or normal computing positions in which positions they cooperate as hereinbefore pointed out with the column unit dogs 121 and 123. Now when the total tabulator reed 151 is moved up into tabulation stopping position, the pin 154 rocks the member 156 in a clockwise direction so that the stud 158 of said member presses the slide 159, and the comb 162 carried thereby, to the rear, to thereby rock the cam plates 47 about their lower edges and position the upper edges thereof in the path of movement of other column unit dogs 121' and 123' shown in Fig. 9. In this manner it is possible to obtain automatic selection of certain totalizers when computing in a preselected column and automatic selection of certain other totalizers when printing a total in that column. As best seen in Fig. 9, a latch member 167 is urged by a spring 168 in a clockwise direction about a pivot 169 and when the slide 159 is pressed to the rear, an end of the latch member snaps down behind a shoulder 170 provided upon said slide to thereby hold the slide and the cam plates in their rearward position. As the carriage moves out of the total printing zone or column, the column unit 37 passes over a member 171 to thereby rock the latch member 167 in a counterclockwise direction and release the slide 159 for return forward movement to its normal position under the action of its spring 160.

There is a floating reed 172, as shown in Fig. 9, extending parallel to the denominational jacks 38 and so positioned as to be depressed by the column unit 37 whenever a computing or total taking zone is entered. However since this reed is merely floating, no function is normally produced when it is depressed. Adjacent the reed 172 is a reed 173 which does not extend high enough to be struck by the column unit. The reed 172 is provided with a pin 174 extending toward the reed 173 and the reed 173 is provided with a pin 175 extending toward the reed 172. When the total key is operated and the slide 159 moves rearward as aforesaid, the enlarged head 165 of the interponent 164 is positioned between the two pins 174 and 175 so that at that time depression of the floating reed 172 will cause a corresponding depression of the reed 173.

From Fig. 9, it will be observed that the dog 123', which is equivalent to the dog 123 except that it cooperates with its cam plate when said plate is in its total taking position, is not only longer than the dog 121' but is also wider than the dog 121'. When the carriage is tabulated to total taking position, the dog 123' contacts and depresses its cam plate 47 just before the carriage comes to rest with the column unit 37 resting upon and depressing the reed 172. For a reason which will later become clear, the dog 121' does not contact its cam plate until the column unit moves off of the reed 172.

The dog 123' is the one which selects the register from which the total is to be taken, and if that total is to be transferred to another register, the dog 121' is so positioned on the column unit 37 as to select the desired total receiving register.

The reed 173 rests upon a push link 176 which is operatively connected to a bar 177 by means of a bell crank 178, as best seen in Fig. 9. The bar 177 is articulated at 179 to a cross blade 180, similar to the cross blades 43 and there are three distributive racks 181 articulated to the blade 180. Each rack 181 is provided upon its forward end with a coupler member 182. The coupler members 182 are operated by the plates 46 in accordance with the selection of the registers by the dogs 121' and 123' in the same manner as the couplers 44 previously referred to. Thus when the dog 123' selects a register for total taking, the coupler member 182 for the particular register selected is raised along with the couplers 44 but the various couplers 44 and 182 of the other registers are not raised at that time.

There is a fore and aft movable bar 183 associated with each of the distributive racks 181. These bars 183 are similar to the differential actuator bars 29 but do not carry indexable pins. The bars 183 are provided with front and rear elongated slots 184 and 185 for mounting said bars on stationary guide pins 186 and 187 respectively and are normally held in their rearward positions by spring devices 33. Each bar 183 is provided with a pin 188 with which the lower end of a rocker arm 189 is lightly engaged.

As the carriage moves into the total taking zone, the dog 123' causes all the couplers 44 and the coupler 182 for the register from which the total is to be taken to be raised, as aforesaid. When the column unit 37 comes to rest upon the reed 172 the enlarged head 165 of the interponent 164 causes the reed 173 to move downward and as a result the coupler 182 which has been raised will push against the bar 183 and move same forward as will readily be understood. Since as pointed out all of the racks 181 are articulated to the blade 180, they will all move forward at this time but only the bar 183 corresponding to the raised coupler 182 will be affected thereby. As the bar 183 moves forward, its pin 188 presses against the end of the rocker arm 189 and moves the arm in a clockwise direction to thereby drop a group of interponent plates 190 for a group of value sensing feelers 191 for that register, see Figs. 1 and 9.

The construction and operation of the interponent plates 190 and feelers 191 is identical with that described in Patent No. 2,372,681, previously referred to. Briefly described, there is a feeler 191 for each totalizer wheel 26 and an interponent plate 190 for each feeler. The upper ends of the rocker arms 189 cooperate with a series of latches 192. Only one latch is shown herein, but it is to be understood that there are a pair of latches 192 for each totalizer. Each latch is normally positioned beneath an ear 193 provided upon a plate 194 and as explained in the Patent No. 2,372,681, when the latches 192 are removed from beneath the ears 193, the plates 194 drop down and the set of interponent plates likewise drop down to position a camming end 195 of each plate between a pair of adjacent teeth of the drive racks 31.

There is a set of interponent plates 190 and a set of feelers 191 for each totalizer and the withdrawal of a pair of latches 192 drops the set of interponent plates corresponding to one of the totalizers. There is a single transverse bar 196 extending across the machine and normally positioned in front of a shoulder provided upon the feelers to hold said feelers in retracted position. However when the bar 196 is allowed to move forward by means presently to be described, the set of feelers corresponding to the set of dropped interponent plates is allowed to move forward. Each feeler is urged forward by its own individual spring, not shown, until the end thereof engages one of a spiral array of stops 197 provided upon each totalizer wheel. Each feeler is stopped in a forward position corresponding to the digital value of its totalizer wheel 26.

As the carriage moves through the total printing zone, the column unit 37 depresses the jacks 38 one at a time to move the pin bars 29 slightly forward to pin setting position in a seriatim fashion from the highest to the lowest denominational order, as previously explained. This slight forward movement is sufficient to cam the interponent plates 190 upward. With the feelers 191 in forward position, a pin 198 provided upon an arm 199 of each feeler overlies the top edge of the interponent plates so that when said plates are raised, the arms 199 will likewise be raised, see Fig. 9. Raising of an arm 199 of a feeler 191 causes a tab 200 on said arm to lift one of a series of transverse blades 201 to close a switch 202 corresponding to the digit being sensed, see Fig. 1.

Each switch 202, is in a circuit including a solenoid 203, Fig. 1, and when a switch is closed, the corresponding solenoid will be energized. Energization of a solenoid causes the armature 204 thereof to raise the end of the draw link 16 and engage the pawl 19 thereof with the fluted shaft 20. This causes the digit to be printed and the corresponding index pin 30 to be set in the same manner as does manual operation of the digit keys 11.

The transverse bar 196 is carried by link members 205, only one of which is shown, see Figs. 1 and 9, which links are each pivotally connected to one of a plurality of arms 206, only one shown, fixed to a transverse rock shaft 207. A spring 208 connected to one of the arms 206 tends to pull the bar 196 forward. An elongated link 208 is secured at one end to the bar 196 and at its opposite end is provided with a shoulder 209 and normally restrained from forward movement by a latch member 210 fixed to a rock shaft 211. A stationary pin 212 fitted within a slot 213 serves to guide the rearward end of the link 208, see Fig. 9.

The left hand distributive rack 181 is provided with a vertically extending tail 214, shown in Fig. 9, which is engaged with a pin 215 carried by an arm 216 fixed to the shaft 211. As the left hand rack 181 moves forward, its tail 214 pulls against the arm 216 to thereby rock the shaft 211 and lift the latch member 210 from the shoulder 209. The transverse bar 196 then moves forward under the action of the spring 203, thus allowing the feelers 191 of the selected register to become activated or move forward into total sensing position as previously explained.

A rock shaft 217 extends across the machine parallel to and slightly above the blades 43 and 180. Fixed to one end of the shaft 217 is an arm 218 urged by a spring 219 in a direction to cause counterclockwise rotation of said shaft. Arm 218 is provided with a square stud 220 over which is fitted a latch portion 221 of an arm 222 loosely mounted upon the shaft 211. The latch arm 222 normally prevents rotation of the shaft 217.

Three identical arms 223 are fixed to the shaft 217 and three yoke members 224 are loosely mounted upon said shaft. The arms 223 are each provided with a projection 225, as best seen in connection with the right hand arm in Fig. 9. A tension spring 226 extends between the yokes 224 and a pin 227 carried by the arms and serves normally to resiliently hold the yoke in abutment with the projection 225.

As best seen in Fig. 1, the arm 222 is provided upon its forward end with a cam surface 228 and the long link 208 is provided upon its rearward end with a pin 229. As the long link 208 moves forward during the total taking operation, the pin 229 strikes the cam surface 228 to thereby lift the arm 222 and release the square stud 220, whereupon the spring 219 is effective to rock the shaft 217 in a counterclockwise direction. As the shaft rocks counterclockwise, an arcuate surface 230 of a yoke 224 moves down behind the end of the bar 183 which has moved forward to thereby hold said bar in its forward position after the column unit leaves the reed 172. The springs 226 provide yielding connections between the arms 223 and yokes 224 so that the bars 183 which have not been moved forward will not interfere with the rotation of the shaft 217.

An arm 231 is also fast on the shaft 217 and, as best seen in Fig. 9, this arm is provided upon its free end with a stud 232 fitted within a notch 233 in a bifurcated end of a member 234. The member 234 is pivotally connected to a bar 235 and carries a pin 236 normally located a short distance in front of an abutment member 237 secured to the middle rack 181.

When the racks 181 move forward as explained above, the abutment member 237 moves into contact with the pin 236 on the member 234. Then when the shaft 217 rotates, the arm 231, through its stud 232, depresses the end of member 234 and the pin 236 wipes against the abutment member and thereby wedges the bar 235 forward.

The bar 235 is articulated at 238, as seen in Fig. 9, to a blade 239 similar to the blades 43 and 180, and three distributive racks 240 are also articulated to said blade. The racks 240 therefore move forward at the same time as the bar 235. The distributive racks 240 are the ones which operate the ultra-denominational pin bars 29 and since these racks 240 are unlike the racks 42 inasmuch as they do not have coupler members, all three of the ultra-denominational bars 29 move forward into pin setting positions at the same time.

Thus while the carriage is in the position whereat the dog 123' is resting upon the reed 172, the digit sensing feelers 191 for the total taking register have moved forward and the ultra-denominational actuator bars have all moved forward into pin setting position.

As the ultra-denominational bar 29 for the total taking register moved forward, it raised the associated interponent plate 190 and consequently caused a pair of the contacts 202 to close. This ultra-denominational order is the one used for determining whether the amount in the register is positive or negative in character, but since it is fully explained in the hereinbefore referred to Patent No. 2,398,395 that no printing is performed when the ultra-denominational interponent plate 190 is operated but that either a "0" or a "9" pin 30 is indexed in the bar 29, it is believed sufficient to here mention that fact without repeating the details of construction which cause this operation. In said patent, the order which is herein referred to as the "ultra-denominational" order is referred to as the "highest" order.

Since the pins 30 are indexed by the pin setting bars 35 which extend across all three fields of pins, and since all of the ultra-denominational pin bars 29 have moved forward as pointed out, whichever pin, "0" or "9", is indexed in the ultra-denominational order for the total taking register will also be indexed in the ultra-denominational order for the other two register groups.

As explained in Patent No. 2,398,395, as the pins are indexed in the ultra-denominational bars 29, the carriage escapes to the next letter space position at which point the column unit 37 rests upon the highest order denominational jack 38. When the column unit leaves the reed 172, the pressure of course is removed from the abutment member 237 and the spring devices 33 associated with the ultra-denominational bars 29 are sufficiently strong to move said bars and their racks 240 to their home positions wherein the pins 30 are no longer in position to be affected by the bars 35.

The dog 121' is so situated that during the movement of the carriage wherein the column unit 37 moves from the reed 172 to the jack 38, said dog contacts and depresses its associated cam plate 47. Thus immediately prior to the operation of the highest order jack 38, and consequently the highest order (after the ultra-denominational order) bar 29, the total receiving register is selected by the short dog 121'.

This selection of a total receiving register is of course effective to raise a second set of couplers 44 and the coupler member 182 for this second register. The interponent releasing bar 183 associated with the second coupler member 182 will however not be operated because the column unit is no longer depressing the reed 172.

When the column unit 37 depresses the highest order jack 38, the highest order interponent plate 190 is raised and the highest order digit is printed and indexed if it is a significant figure or merely indexed if insignificant, as explained in the above referred to Patent No. 2,398,395. Since two totalizers have at this time been selected, a pin 30 will be set in the highest order bar 29 of both registers. This process continues until all of the digits have been printed and indexed in both fields of pins. Thus we have pins 30, corresponding to the amount which has been printed, indexed in two sets of pin bars 29. During the cycle following the printing of the last digit, the indexed amount will be run out of the totalizer from which the total was printed, since said totalizer was selected for subtractive operation by the long dog 123' and the same amount will be entered additively into the totalizer selected by the short dog 121'.

It will be understood that even though the "0" or "9" pin 30 was indexed, as above explained, in all three of the ultra-denominational bars 29, the third register will not be affected thereby because of the fact that this register will remain in its neutral position during the cycle. As previously noted, the only registers which are active during a cycle are those whose state-control slides 69 have been allowed to move forward because of a column unit dog depressing a cam plate 47.

As seen in Fig. 9, an arm 241 is fixed to the shaft 217. The arm 241 is provided on its free end with a pin 242 fitted within a slot provided in a member 243. The member 243 is pivotally mounted at 244 and is provided with a camming edge 245. A roller 246 is provided upon a crank 247 secured as shown in chain-dotted lines in Fig. 9, to the main cycle shaft 56, and during the cycle, the roller 246 wipes against the camming edge 245 to thereby restore the shaft 217 and its associated parts to normal position. As the shaft 217 is restored, the arm 222 settles over the square stud 220 to retain said stud and the shaft 217 in normal position shown in the drawing.

From the above description it is apparent that by merely depressing the single total key 12, the carriage will tabulate to a predetermined columnar position, the machine will automatically print the amount standing in any preselected totalizer, and will transfer that amount to another preselected totalizer. By proper arrangement of the column unit dogs, the amount printed may be added into a second totalizer or may be subtracted from the second totalizer or may be added in a second totalizer and subtracted from a third totalizer. In other words the present machine has complete flexibility and is adaptable, by proper arrangement of the column units 37, for adding or subtracting amounts in any columnar position in any combination of totalizers, for automatically printing totals from any totalizer and for transferring the printed total to any other totalizer either additively or subtractively.

Having thus described the invention, what is claimed is:

1. In a combined typewriting and computing machine, a plurality of add-subtract totalizers, a field of indexable pins associated with each totalizer, a set of normally inactive amount sensing devices associated with each totalizer, means for activating any one of said sets of amount sensing devices, means controlled by said sensing devices for indexing more than one of said fields of pins in accordance with the amount sensed by said activated set of sensing devices, and a cycling general operator for running the indexed amount negatively into the totalizer from which the amount is sensed to thereby clear that totalizer and to simultaneously run said amount positively into another of said totalizers.

2. A combined typewriting and computing machine comprising, a letter spaceable carriage, a plurality of add-subtract totalizers, carriage carried means for conditioning the totalizers for receiving amounts additively or subtractively selectively in a plurality of carriage zones, a set of indexable differential actuators associated with each totalizer for running indexed amounts into said totalizers additively or subtractively in accordance with the selection of the carriage carried means, a set of normally inactive value sensing devices associated with each totalizer, a first totalizer control means operable by said carriage carried means at a first position within a zone for conditioning a set of actuators for indexing, means for activating the set of value sensing devices associated with the totalizer corresponding to the set of conditioned actuators, said first totalizer control means also conditioning its associated totalizer for subtractive operation, a second totalizer control means operable by said carriage carried means at a second position within the zone for conditioning a second set of actuators for indexing, said second totalizer control means also conditioning its associated totalizer for additive operation, means controlled by the set of activated value sensing devices for indexing both sets of actuators in accordance with the amount in the totalizer being sensed, and a cycling general operator for running the indexed amount into both totalizers in accordance with additive and subtractive operations determined by the carriage carried means, to thereby clear the first totalizer and to cause the amount to be entered into the second totalizer.

3. In a combined typewriting and computing machine, a plurality of totalizers constructed and arranged to receive amounts positively and negatively, a field of indexable pins associated with each totalizer, a cycling general operator for running indexed amounts into said totalizers, sensing means for automatically sensing the amount accumulated in any one of said totalizers, printing means controlled by said sensing means for printing said amount, means operated by said printing means for indexing more than one of said fields of pins as the amount is printed, and means operable during a cycle of said general operator to run the indexed amount either positively or negatively into a totalizer other than the one from which the amount was sensed.

4. In an accounting machine, a carriage tabulatable to a plurality of column zones, a totalizer adapted to be operated additively in certain column zones of said carriage and to be operated subtractively in others, a set of indexable differential actuators for running amounts into said totalizer, said differential actuators being normally in a non-indexable position, means for moving said differential actuators to an indexable position, said means comprising devices operable by said carriage and coupler members carried by said devices, spring powered means for moving said coupler members from a normally inactive position to an active position, a latch element carrying member normally restraining said spring powered means, spring urged state control means for determining the operation of said totalizer, an add latch and a subtract latch normally restraining said state control means, a control device, means on said carriage for moving said control device to a first position when said carriage is in one column zone, means on said carriage for moving said control device to a second position when said carriage is in another column zone, a linkage operatively connecting said control device with said latch element carrying member and operable upon movement of said control device to its first position to move said latch element carrying member and thereby permit said spring powered means to move said coupler members, means operable by the movement of said spring powered means to release said add latch and thereby permit said state control member to move to an addition determining position, means operable by said latch element carrying member when said control device is moved to its second position to release said subtract latch and thereby permit said state control member to move to a subtraction determining position.

5. In an accounting machine, an add-subtract totalizer, a set of differential actuators for running amounts into said totalizer, a field of indexable pins carried by said differential actuators, said pins being normally out of indexable position, means for moving said differential actuators to a position wherein said pins may be indexed, means for indexing amounts in said pins when said differential actuators are in indexable position, a movable control carriage, said means for moving said differential actuators comprising devices operable by said carriage and coupler members carried by said devices, said coupler members being movable from a normally inactive position to an active position, spring powered means for moving said coupler members to their active position, a pivotally mounted latch member normally restraining said spring powered means, control means operable by said carriage to a first position, a linkage operatively connecting said control means with said latch member whereby when said control means is moved to said first position said latch member will be pivoted to release said spring powered means and thereby permit said spring powered means to move said coupler members to active position, a state control member for determining the add or subtract operation of said totalizer, a spring operatively connected to said state control member for moving said member, an add latch and a subtract latch normally restraining said state control member, means operated by said spring powered means to release said add latch to thereby permit said state control member to move to an addition determining position, means on said carriage to move said control means to a second position to thereby cause said linkage to pivot said latch member to a greater extent than is necessary to release said spring powered means, said greater extent of pivotal movement of said latch member causing said latch member to release said subtract latch and thereby permit said state control member to move to a subtraction determining position.

GEORGE K. SCHULZ.

References Cited in the file of this patent

UNITED STATES PATENTS

| Number | Name | Date |
|---|---|---|
| 1,528,390 | Ansart | Mar. 3, 1925 |
| 2,038,717 | Christian | Apr. 28, 1936 |
| 2,091,717 | Pitman | Aug. 31, 1937 |
| 2,372,681 | Pitman | Apr. 3, 1945 |
| 2,398,395 | Pitman | Apr. 16, 1946 |